United States Patent Office 2,998,420
Patented Aug. 29, 1961

---

2,998,420
6-SULFAMOYLPTERIDINE DERIVATIVES
Joseph Weinstock, Phoenixville, Pa., assignor to Smith Kline & French Laboratories, Philadelphia, Pa., a corporation of Pennsylvania
No Drawing. Filed Mar. 28, 1961, Ser. No. 98,764
6 Claims. (Cl. 260—251.5)

This invention relates to novel 6-sulfamoylpteridine derivatives having useful diuretic and natriuretic activity.

The 6-sulfamoylpteridine derivatives of this invention are represented by the following fundamental formula:

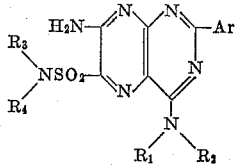

FORMULA I when:
Ar represents phenyl, chlorophenyl, tolyl, methoxyphenyl, trifluoromethylphenyl, hydroxyphenyl, aminophenyl, thienyl or pyridyl; and $R_1$, $R_2$, $R_3$ and $R_4$ represent hydrogen or lower alkyl having 1–4 carbon atoms inclusive, preferably methyl or ethyl.

Advantageous compounds of this invention are represented by the following formula:

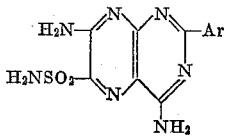

FORMULA II in which Ar is thienyl or

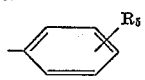

when $R_5$ is hydrogen, methyl, methoxy, hydroxy or amino.

A particularly advantageous compound is 4,7-diamino-2-phenyl-6-sulfamoylpteridine.

The 6-sulfamoylpteridines of this invention are prepared by reacting a 4,6-diamino-2-aryl-5-nitrosopyrimidine with a sulfamoylacetonitrile according to the following procedure:

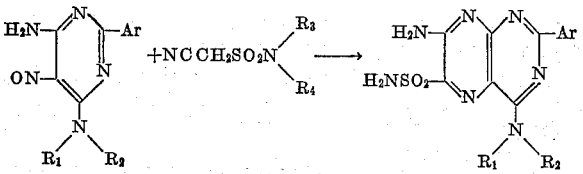

The terms Ar, $R_1$, $R_2$, $R_3$ and $R_4$ are as previously defined.

The 4,6-diamino-2-aryl-5-nitrosopyrimidine starting materials are known to the art. The preparation of the starting material, sulfamoylacetonitrile, is fully described in my copending application, Serial No. 10,067, filed on February 23, 1960, now U.S. Patent No. 2,978,482, of which the present application is a continuation in part.

Briefly, sulfamoylacetonitrile is prepared by reacting chlorosulfonylacetyl chloride with at least two molar equivalents of phenol at an elevated temperature such as from about 100 to 150° C. for about 10 to 12 hours. Cooling and recrystallizing the resulting solid from a suitable solvent such as benzene or benzene-petroleum ether gives diphenyl sulfoacetate. Ammonolysis of this diester at about 60 to 90° C. for about 10 to 12 hours gives α-sulfamoylacetamide. Dehydration of this acet-amide is accomplished by reacting with a dehydrating agent such as phosphorus pentoxide, thionyl chloride or, preferably, phosphorus oxychloride. The reaction is carried out preferably with an excess of dehydrating agent at about 65 to 100° C. for about 30 to 90 minutes to give sulfamoylacetonitrile.

The N-substituted-sulfamoyl acetonitrile starting materials are prepared by reacting diphenyl sulfoacetate with a lower alkylamine or a di-lower alkylamine. The resulting N-lower alkylsulfamoyl-N-lower alkylacetamide or N,N-di-lower alkyl compound is heated, conveniently at reflux, with sulfuric acid in a lower alcohol such as ethanol or methanol to give lower alkyl N-lower alkyl-(or N,N-di-lower alkyl)sulfamoylacetate. Ammonolysis of this ester gives the α-N-lower alkyl(or N,N-di-lower alkyl)sulfamoylacetamide which on dehydration, furnishes the N-alkyl(and N,N-dialkyl)sulfamoylacetonitrile starting material.

The 6-sulfamoylpteridine derivatives of this invention are prepared by reacting a 4,6-diamino-2-aryl-5-nitrosopyrimidine with a sulfamoylacetonitrile usually in excess in a suitable organic solvent in which the reactants are substantially soluble such as, for example, ethanol, t-butanol, isopropanol, ethoxyethanol or dimethylformamide. The reaction is usually carried out in the presence of an alkali metal alkoxide such as a potassium or sodium alkoxide, for example sodium methoxide, potassium t-butoxide or sodium ethoxide. The reaction mixture is heated at temperatures of from about 50–200° C., preferably at the reflux temperature of the reaction mixture for about 5 to 30 minutes or up to about 24 hours depending upon the solvent employed. Dilution of the mixture with approximately an equal volume of water results in the precipitation of the 6-sulfamoylpteridine of this invention. Alternatively the product is isolated by removing the solvent from the reaction mixture, then adding water to the residue and filtering.

The reaction of 4,6-diamino-2-aryl-5-nitrosopyrimidine and sulfamoylacetonitrile may also be carried out by heating with sodium acetate in glacial acetic acid. Alternatively the reactants may be heated in a liquid tertiary amine such as pyridine or picoline at temperatures above 50° C. for about 1–12 hours to give the 6-sulfamoylpteridines of this invention.

The following examples are not limiting but are illustrative of the compounds of this invention and the preparation thereof.

*Example 1*

Sulfamoylacetonitrile (4.0 g.) and 1.78 g. of sodium methoxide are added to a hot solution of 6.45 g. of 4,6-diamino-5-nitroso-2-phenylpyrimidine in 150 ml. of dimethylformamide. The resulting mixture is refluxed for 15 minutes. Water (150 ml.) is added and the resulting product is filtered off, washed with water and recrystallized from aqueous dimethylformamide to give 4,7-diamino-2-phenyl-6-sulfamoylpteridine.

*Example 2*

To a refluxing solution of 7.5 g. of 4,6-diamino-2-(p-chlorophenyl)-5-nitrosopyrimidine in 150 ml. of dimethylformamide is added 4.0 g. of sulfamoylacetonitrile and 1.8 g. of sodium methoxide. After refluxing the resulting mixture for 10 minutes, water is added and the resulting precipitate is filtered and recrystallized from dimethylformamide to give 4,7-diamino-2-(p-chlorophenyl)-6-sulfamoylpteridine.

Similarly using 4,6-diamino-2-(o-chlorophenyl)-5-nitrosopyrimidine in the above procedure, 4,7-diamino-2-(o-chlorophenyl)-6-sulfamoylpteridine is obtained.

*Example 3*

A mixture of 3.4 g. of 4,6-diamino-5-nitroso-2-(p-tolyl)-pyrimidine, 2.0 g. of sulfamoylacetonitrile and 0.9 g. of sodium methoxide in 100 ml. of ethoxyethanol is heated at reflux for 10 minutes. Cooling, adding water and filtering gives 4,7-diamino-2-(p-tolyl)-6-sulfamoylpteridine.

*Example 4*

A refluxing solution of 7.3 g. of 4,6-diamino-2-(p-methoxyphenyl)-5-nitrosopyrimidine in 200 ml. of dimethylformamide is treated with 4.0 g. of sulfamoylacetonitrile and 1.8 g. of sodium methoxide. The mixture is refluxed for 20 minutes, then treated with water and filtered to give 4,7-diamino-2-(p-methoxyphenyl)-6-sulfamoylpteridine.

*Example 5*

Treating 6.8 g. of 4,6-diamino-2-(m-aminophenyl)-5-nitrosopyrimidine in refluxing dimethylformamide with 4.0 g. of sulfamoylacetonitrile and 2.1 g. of sodium ethoxide, refluxing the resulting mixture for five minutes, adding water and filtering gives 4,7-diamino-2-(m-aminophenyl)-6-sulfamoylpteridine.

*Example 6*

A mixture of 4.5 g. of 4,6-diamino-5-nitroso-2-(3'-thienyl)-pyrimidine, 2.6 g. of sulfamoylacetonitrile, 1.1 g. of sodium methoxide and 100 ml. of dimethylformamide is refluxed for 15 minutes. Adding water to the cooled mixture and filtering yields 4,7-diamino-2-(3'-thienyl)-6-sulfamoylpteridine.

Similarly using 4,6-diamino-5-nitroso-2-(2'-thienyl)-pyrimidine as the starting material, 4,7-diamino-2-(2'-thienyl)-6-sulfamoylpteridine is obtained.

*Example 7*

A mixture of 6.8 g. of 6-amino-4-methylamino-5-nitroso-2-phenylpyrimidine, 4.0 g. of sulfamoylacetonitrile, 1.8 g. of sodium methoxide and 150 ml. of dimethylformamide is refluxed for 15 minutes. Adding water and filtering gives 7-amino-4-methylamino-2-phenyl-6-sulfamoylpteridine.

Similarly using 7.2 g. of 6-amino-4-dimethylamino-5-nitroso-2-phenylpyrimidine or 9.4 g. of 6-amino-4-dibutylamino-5-nitroso-2-phenylpyrimidine in the above procedure, the products are 7-amino-4-dimethylamino-2-phenyl-6-sulfamoylpteridine and 7-amino-4-dibutylamino-2-phenyl-6-sulfamoylpteridine respectively.

*Example 8*

To a refluxing mixture of 2.8 g. of 4,6-diamino-5-nitroso-2-(p-trifluoromethylphenyl)-pyrimidine in 100 ml. of t-butanol is added 1.5 g. of sulfamoylacetonitrile and 1.3 g. of potassium t-butoxide. The resulting mixture is heated at reflux for 24 hours. Water is added and the precipitate is filtered off and recrystallized from dimethylformamide to give 4,7-diamino-2-(p-trifluoromethylphenyl)-6-sulfamoylpteridine.

*Example 9*

Sulfamoylacetonitrile (1.3 g.) and 0.6 g. of sodium methoxide are added to a hot solution of 2.1 g. of 4,6-diamino-5-nitroso-2-(4'-pyridyl)-pyrimidine in dimethylformamide. Refluxing the resulting mixture for 20 minutes, concentrating, adding water and filtering gives 4,7-diamino-2-(4'-pyridyl)-6-sulfamoylpteridine.

*Example 10*

Treating 6.9 g. of 4,6-diamino-2-(m-hydroxyphenyl)-5-nitrosopyrimidine in refluxing dimethylformamide with 4.0 g. of sulfamoylacetonitrile and 1.7 g. of sodium methoxide, refluxing the resulting mixture for five minutes and working up as in Example 9 gives 4,7-diamino-2-(m-hydroxyphenyl)-6-sulfamoylpteridine.

*Example 11*

A mixture of 25 g. of diphenyl sulfoacetate and 35 ml. of liquid methylamine are heated in a sealed tube at 75° C. for 17 hours. The mixture is then dissolved in methanol, warmed to remove excess methylamine, then heated to boiling, cooled and filtered to give α-N-methylsulfamoyl-N-methylacetamide.

Ten grams of the above prepared acetamide, 7 ml. of concentrated sulfuric acid and 150 ml. of absolute ethanol are refluxed for 24 hours. The excess ethanol is removed and the residue is crystallized from benzene. The product is ethyl N-methylsulfamoylacetate.

A mixture of 5.5 g. of ethyl N-methylsulfamoylacetate and 50 ml. of liquid ammonia is stirred for 16 hours. Methanol is added, the mixture is warmed to remove excess ammonia, then is cooled and filtered to give α-N-methylsulfamoylacetamide.

Five grams of α-N-methylsulfamoylacetamide and 15 ml. of phosphorus oxychloride are heated on a steam bath for 45 minutes. The excess phosphorus oxychloride is evaporated in vacuo and the residue is taken up in butanol. Concentrating and chilling the butanol solution gives N-methylsulfamoylacetonitrile.

A mixture of 6.45 g. of 4,6-diamino-5-nitroso-2-phenylpyrimidine, 4.4 g. of N-methylsulfamoylacetonitrile, 1.78 g. of sodium methoxide and 150 ml. of dimethylformamide is heated at reflux for 20 minutes. Adding water and filtering gives 4,7-diamino-2-phenyl-6-methylsulfamoylpteridine.

*Example 12*

Three grams of N,N-dimethylsulfamoylacetonitrile, prepared as in Example 11 from dimethylamine and diphenylsulfoacetate, and 3.7 g. of sodium methoxide are added to a hot solution of 4.3 g. of 4,6-diamino-5-nitroso-2-phenylpyrimidine. The resulting mixture is refluxed for 15 minutes, treated with water and filtered to give 4,7-diamino-2-phenyl-6-dimethylsulfamoylpteridine.

Similarly, using 3.0 g. of N-ethylsulfamoylacetonitrile or 3.5 g. of N-butylsulfamoylacetonitrile, both prepared as in Example 11, in the above procedure furnishes 4,7-diamino-2-phenyl-6-ethylsulfamoylpteridine and 4,7-diamino-2-phenyl-6-butylsulfamoylpteridine respectively.

What is claimed is:
1. A chemical compound having the following formula:

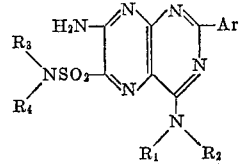

in which Ar is a member selected from the group consisting of phenyl, chlorophenyl, tolyl, methoxyphenyl, trifluoromethylphenyl, hydroxyphenyl, aminophenyl, thienyl and pyridyl; $R_1$, $R_2$, $R_3$ and $R_4$ are members selected from the group consisting of hydrogen and lower alkyl having 1–4 carbon atoms.

2. A chemical compound having the following formula:

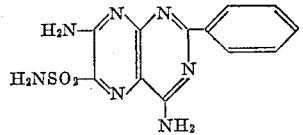

3. A chemical compound having the following formula:

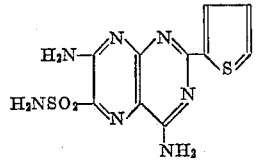

4. A chemical compound having the following formula:
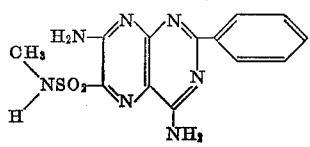
5. A chemical compound having the following formula:
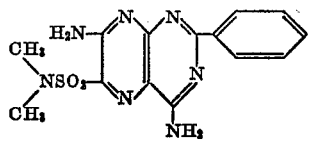
6. A chemical compound having the following formula:
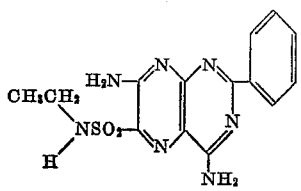
No references cited.